United States Patent
Myers, Sr.

(10) Patent No.: US 6,315,690 B1
(45) Date of Patent: Nov. 13, 2001

(54) ORBITAL TRANSMISSION

(76) Inventor: Raymond T. Myers, Sr., P.O. Box 28726, Dallas, TX (US) 75228

(*) Notice: Subject to any disclaimer, the term of this patent is extended or adjusted under 35 U.S.C. 154(b) by 0 days.

(21) Appl. No.: 09/541,730

(22) Filed: Apr. 3, 2000

(51) Int. Cl.[7] .............................. F16H 3/72; F16H 37/06
(52) U.S. Cl. .............................. 475/7; 475/340; 74/724
(58) Field of Search .............................. 475/7, 72–84, 475/340; 74/44, 724

(56) References Cited

U.S. PATENT DOCUMENTS

| | | | |
|---|---|---|---|
| 2,785,369 | 3/1957 | Ligh | 318/475 |
| 2,940,337 | 6/1960 | Kalb | 74/675 |
| 3,146,636 | 9/1964 | Wollenhaupt | 74/675 |
| 3,429,201 | 2/1969 | Zucchellini | 74/675 |
| 3,886,805 | * 6/1975 | Koderman | 74/52 |
| 3,979,971 | 9/1976 | Generke | 74/626 |
| 4,635,494 | 1/1987 | Conklin | 74/119 |
| 4,885,955 | 12/1989 | Kraus | 74/691 |
| 5,186,692 | * 2/1993 | Gleasman et al. | 475/78 |
| 5,295,920 | 3/1994 | Sawasaki | 475/210 |
| 5,309,778 | * 5/1994 | Antonov | 74/15.86 |
| 5,769,748 | 6/1998 | Eyerly | 475/5 |
| 5,961,418 | 10/1999 | Tamiguchi | 497/47 |
| 6,006,619 | * 12/1999 | Gindentuller et al. | 74/44 |

FOREIGN PATENT DOCUMENTS

98/22731 * 5/1998 (AU).
07224417 * 8/1995 (JP).

* cited by examiner

Primary Examiner—Sherry Estremsky
Assistant Examiner—Tisha D. Lewis
(74) Attorney, Agent, or Firm—Rudolf O. Siegesmund

(57) ABSTRACT

An orbital transmission comprising an input element connected to a first power source, a control element connected to a second power source and an output element connected to the control element whereby rotational power is transmitted by an orbiting gear in the output element. The orbital transmission functions based on the relationship of the speed of the orbit of the orbiting gear and the speed of rotation of the input shaft. When the orbiting gear makes one complete orbit in the same time that the input shaft makes one revolution, then the transmission is in neutral and no rotation will be imparted to the output shaft. When the orbiting gear makes less orbits in a unit of time than the input shaft makes revolutions in the same unit of time, the transmission will impart rotation in a first direction to the output shaft which may be forward. When the orbiting gear makes more orbits in a unit of time than the input shaft makes revolutions in the same unit of time, the transmission will impart rotation in a second direction to the output shaft which may be reverse. The direction of rotation of the input shaft must be the same as the direction of orbit of the orbiting shaft.

8 Claims, 2 Drawing Sheets

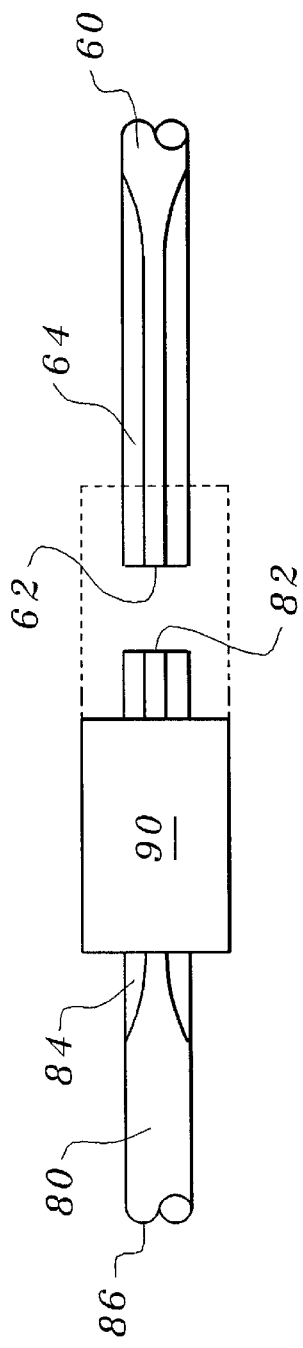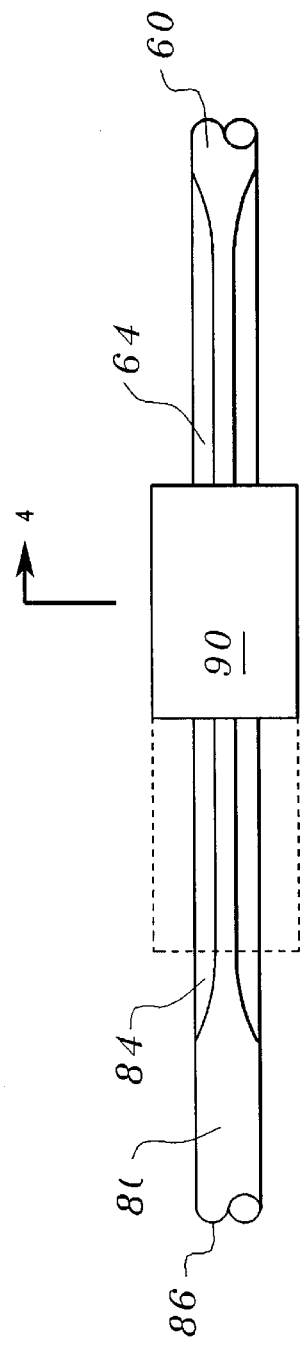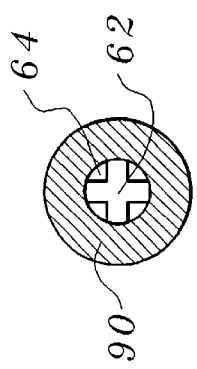

ORBITAL TRANSMISSION

FIELD OF THE INVENTION

The present invention relates to a transmission for applying rotational power gradually from zero to maximum at constant torque throughout the speed range in both forward and reverse.

BACKGROUND OF THE INVENTION

As used herein clutch means a device for coupling two working parts such as the engine and driveshaft of an automobile. In automobiles, manual clutches make use of friction to transmit rotation of the engine crankshaft to the gearbox, and then to the wheels. Moreover, manual clutches use friction linings on a clutch plate to allow the plate to slide before it becomes fully engaged, so that the rotation can be taken up slowly in order to make the automobile move smoothly. Specifically, in a car with a manual gearbox, the clutch is disengaged by pressing down on a clutch pedal to raise a pressure plate away from the clutch plate, disconnecting the flywheel and crankshaft from the transmission shaft. When the clutch pedal is lifted, springs force the pressure plate and clutch plate against the flywheel.

As used herein, synchronized shifting means a gear system by which driving and driven members are brought to the same speed before engaging. Synchronized shifting is accomplished by a collar sliding along the transmission shaft and rotating with the transmission shaft. The collar fits over a cone on the gear wheel, making the wheel speed up or slow down until both are moving at the same speed. The outer toothed ring on the collar then engages the teeth on the cone, locking the collar to the gear wheel.

As used herein, "transmission" means a device that transmits power from the engine of an automobile to the driving wheels and varies the speed ratios between them. As used herein, automatic transmission means a transmission in which the speed ratios are automatically selected and engaged. Automatic transmissions contain a torque converter and an automatic gearbox. The torque converter passes power from the engine flywheel to the gearbox progressively and smoothly. The automatic gearbox contains two sets of epicyclic gears in which gear wheels rotate at different speeds. Except in top gear, the speed of the flywheel is reduced so that the car wheels turn more slowly but with more torque. Reverse gear reverses the direction of the transmission output shaft and therefore the direction of the wheels.

Major automakers have disclosed development of a "stepless automatic" transmission based on British Technologies Group licensed "Torotrak" technolgy for development of an infinitely variable transmission (IVT). The Ford development is based on a "variator" comprising two clusters of free-wheeling rollers hydraulically clamped between two pairs of opposed toroidal discs where the outer discs of each pair are turned continuously by the engine and the rollers take the drive to the two inner, output discs. Tilting the rollers changes the ratio changing the working diameters of the input and output discs. The variator is combined with a single three-element planetary gearset providing a unique "geared neutral" for starting from rest, thereby replacing the usual torque converter. At a critical disc ratio, the two input elements rotate in opposite directions and the third output element is stationary providing no drive to the wheels. By changing the disk angles, the drive is engaged in either forward or reverse. U.S. Pat. No. 5,961,418 discloses an infinitely variable transmission. U.S. Pat. No. 5,295,920 discloses an automatic transmission having a belt type infinitely variable gear housed in a transmission casing. U.S. Pat. No. 4,885,955 discloses a multimode infinitely variable traction roller transmission including a toroidal traction roller transmission for infinitely varying the transmission ratio in each of the modes. U.S. Pat. No. 4,635,494 discloses an infinitely variable transmission with a lever or walking beam having variable fulcrum point. U.S. Pat. No. 4,526,060 discloses a compound planetary gear set used to provide an idle speed control and a vehicle speed control on an automotive type carburetor valve. U.S. Pat. No. 3,429,201 discloses a shaft that is offset from the wormgear or wormwheel with the worm speed controlled by a motor. The speed controls are rotational to the speed of the output shaft. U.S. Pat. No. 3,146,636 discloses a wormgear that is driven with a shaft that has a planet gear and meshes with the pinion.

What is needed beyond the prior art is a simple infinitely variable transmission that has the advantage of a frictionless clutch and the advantages of a stepless transmission.

SUMMARY OF THE INVENTION

The present invention which meets the needs identified above is an orbital transmission comprising an input element connected to a first power source, a control element connected to a second power source and an output element connected to the control element whereby rotational power is transmitted by an orbiting gear in the output element. The first power input is the input shaft of the input element and the second power input is the control gear of the control element. The orbital transmission functions on the relationship of the speeds imparted by the first power source and the second power source. As used herein, orbit will refer to the revolution of gear or shaft's center about a point separate and distinct from the gear or shaft. Rotation will refer to the movement of an object about its own center or central axis. More specifically, the orbital transmission functions based on the relationship of the speed of the orbit of the orbiting gear and the speed of rotation of the input shaft of the input element. The orbiting gear may be rotating while it is orbiting but it is the speed of the orbit in relation to the speed of the rotation of the input shaft that determines forward, neutral and reverse. When the orbiting gear makes one complete orbit in the same time and in the same direction that the input shaft makes one revolution, then the transmission is in neutral and no rotation will be imparted to the output shaft. When the orbiting gear makes less orbits in a unit of time than the input shaft makes revolutions in the same unit of time, the transmission will impart rotation in a first direction to the output shaft which may be forward. When the orbiting gear makes more orbits in a unit of time than the input shaft makes revolutions in the same unit of time, the transmission will impart rotation in a second direction to the output shaft which may be reverse. The direction of rotation of the input shaft must be the same direction as the direction of orbit of the orbiting shaft.

The foregoing and other features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 2 depicts a spline with a sleeve in a first position.

FIG. 3 depicts a spline with a sleeve in a second position.

FIG. 4 depicts a cross sectional view along line 4—4 of FIG. 3.

DETAILED DESCRIPTION OF THE PREFERRED EMBODIMENT

Figure 1:
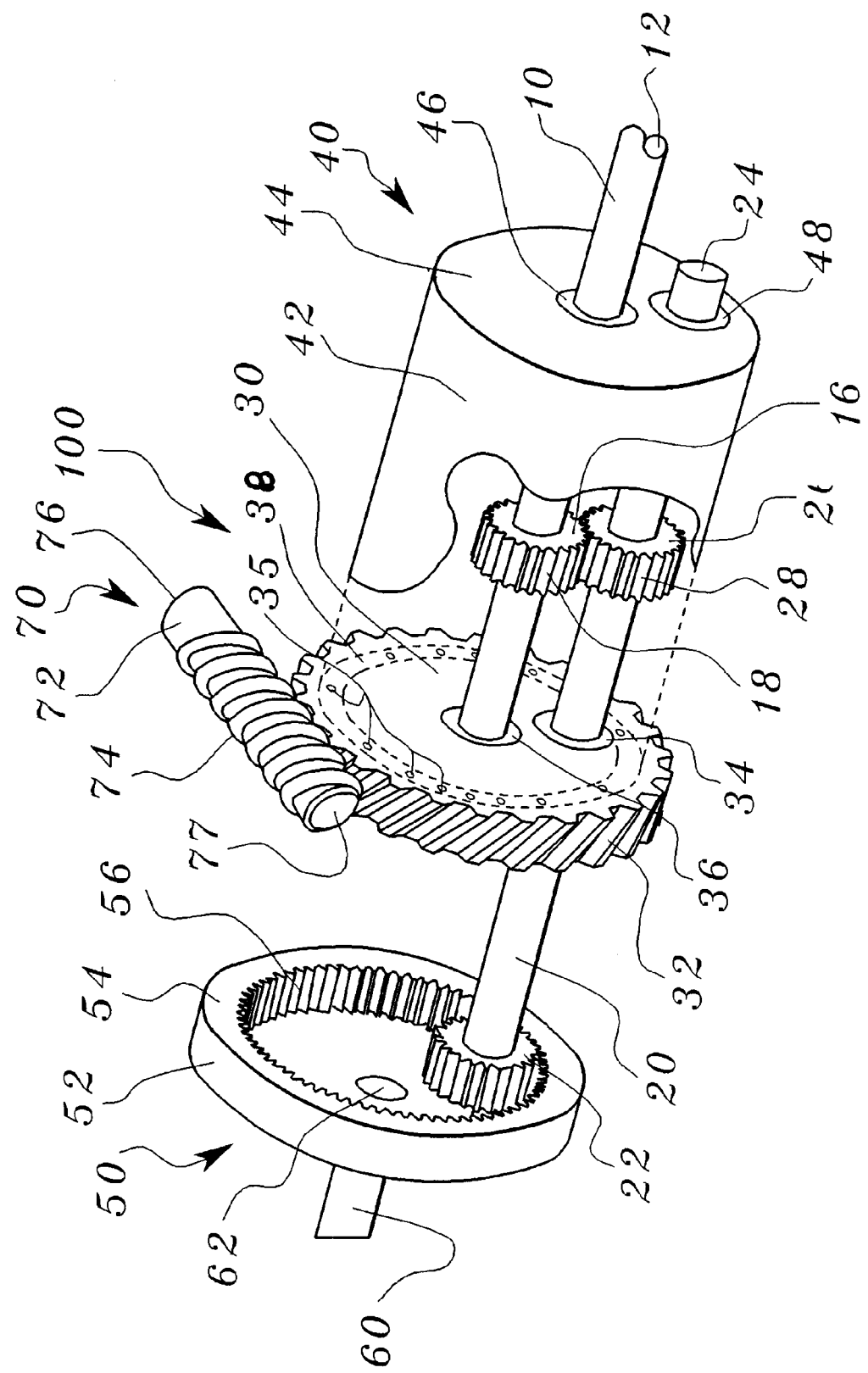
FIG. 1 depicts a left side perspective view of the invention.

FIG. 1 depicts a view of transmission 100. Transmission 100 has an input element 40, an output element 50 and a control element 70. Input element 40 has casing first end 44, first input shaft bearing 46, input shaft 10, casing 42, input shaft gear 18 and first orbiting shaft bearing 48.

Control element 70 has control shaft 72, control wheel 30, second input shaft bearing 36, second orbiting shaft bearing 34. Output element 50 has output shaft 60, internal gear 56, orbiting shaft 20, orbiting shaft connecting gear 28, orbiting shaft second gear 22.

Input shaft 10 has input shaft first end 12 which is connected to a first power source. Input shaft 10 revolves clockwise or counterclockwise and is supported in transmission 100 by first input shaft bearing 46 in casing first end 40 and by second input shaft bearing 36 in control wheel 30. Control shaft 72 has a control shaft drive end 76 and a control shaft free end 77. Control shaft 72 has control shaft gears 74 for mating with control wheel gears 32 of control wheel 30. Control shaft drive end 76 connects to a second power source. Orbiting shaft 20 has free end 24 and orbiting shaft second gear 22 at the opposite end. Free end 24 passes through first orbiting shaft bearing 48 and may end flush with outside surface of casing first end 40 or may extend slightly outside of casing first end 40. Orbiting shaft 20 passes through second input shaft bearing 34. Orbiting shaft 20 has orbiting shaft first gear 28 located between first orbiting shaft bearing 48 and second orbiting shaft bearing 34. Orbiting shaft 20 has orbiting shaft second gear 22.

Casing first end 44 has casing 42 which is affixed to control wheel 30 so that control wheel 30 and casing first end 44 turn together about the center axis of input shaft 10. Casing 42 has casing second end 38 attached to control wheel 30 by securement devices 35. Casing second end 38 is fixedly and removably connected to control wheel 30 by securement devices 35. In the preferred embodiment, securement devices 35 are bolts and casing second end 38 is a flange having holes for receiving the bolts. Control wheel gear 32 extends above casing 42 so that control shaft gears 74 can engage control wheel gears 32 to cause control wheel 30 and casing first end 44 to turn together in response to rotation of control shaft 72. Internal gear 56 is located inside internal gear housing 52 with orbiting shaft second gear 22.

Power is transmitted from input shaft 10 to orbiting shaft 20 by engagement of input shaft gear 18 and orbiting shaft first gear 28.

When control shaft 72 rotates, control shaft gears 74 engage control wheel gears 32 causing control wheel 30 to rotate. When control wheel 30 rotates it causes orbiting shaft 20 to orbit about input shaft 10. When orbiting shaft 20 orbits due to rotation of control wheel 30, orbiting shaft second gear 22 rotates around internal gear 56 in the inside circumference of internal gear housing 52 engaged to internal gear 56.

Input shaft 12 and output shaft 60 are in line. Input shaft 12 and output shaft 60 are not connected directly. Input shaft 12 drives orbiting shaft 20 by the engagement of input shaft gear 18 and orbiting shaft first gear 28. When orbiting shaft 20 rotates in response to input shaft 10, orbiting shaft second gear 22 engages internal gear 56 causing output shaft 60 to rotate in the opposite direction as input shaft 10.

The direction of rotation of input shaft 10 must be the same as the direction of orbit of orbiting shaft 20. Orbiting shaft second gear 22 may be rotating about the center of orbiting shaft 20 while it is orbiting. As used herein, Orbit means the travel of orbiting shaft 20 and orbiting shaft second gear 22 around the point which is the center of input shaft 12 and the center of output shaft 60. The point about which orbiting shaft second gear 22 makes its orbital revolutions can also be defined as the center point of internal gear 56. The speed of the orbit of orbiting shaft second gear 22 in relation to the speed of the rotation of the input shaft determines forward, neutral and reverse. When orbiting shaft second gear 22 makes one complete orbit in the same time and in the same direction that input shaft 12 makes one revolution, then transmission 100 is in neutral and no rotation or torque will be imparted to output shaft 60. When orbiting shaft second gear 22 makes less orbits in a unit of time than input shaft 10 makes revolutions in the same unit of time, transmission 100 will impart rotation and torque in a first direction to output shaft 60 which normally will be forward. When orbiting shaft second gear 22 makes more orbits in a unit of time than input shaft 10 makes revolutions in the same unit of time, transmission 100 will impart rotation and torque in a second direction to output shaft 60 which normally will be reverse. The designation of forward or reverse depends upon the devices to which transmission 100 is connected. The first direction and the second direction refer to directions of rotation in the same plane. Therefore, there are only two directions and the first direction and the second direction will always be opposite to each other. The direction of rotation of input shaft 10 and the direction of orbit of orbiting shaft second gear 22 must be the same. Sensors may be used to determine the rotational speed of input shaft 10 and the orbital speed of orbiting shaft second gear 22.

Therefore, the method of using transmission 100 can be stated in three conditions. First, in order to achieve zero movement or neutral, the orbital speed of orbiting shaft 20 is adjusted to be equal to the rotational speed of input shaft 10. Second, in order to achieve motion in a first direction, the relative speeds of the orbit of orbiting shaft 20 and the rotational speed of input shaft 10 are adjusted so that the rotational speed of input shaft 10 is greater than the orbital speed of orbiting shaft 20. Third, in order to achieve a motion in a second direction, the relative speed of orbit of orbiting shaft 20 and the rotational speed of input shaft 10 are adjusted so that rotational speed of input shaft 10 is less than the orbital speed of orbiting shaft 20. It is the relative speeds that matters. The speed of orbit of orbiting shaft 20 can be adjusted alone, or the speed of rotation of input shaft 10 may be adjusted alone, or the speeds of orbit of orbiting shaft 20 and the speed of rotation of input shaft 10 may be adjusted up or down at the same time. Transmission 100 functions based on the relationship of the speeds of orbit of orbiting shaft 20 and rotation of input shaft 10. Neutral, forward and reverse are achieved by obtaining conditions of relative speed as outlined in the three conditions above.

The output rotation rate and power are controlled by controlling the speed and torque of control gear 32 of control wheel 30 by controlling the speed and torque of control shaft 72 of control arm 70. In the preferred embodiment, control shaft 72 is a worm gear. However, persons skilled in the art know many alternative methods to cause orbiting shaft 20 to orbit such as bevel gears and pulleys so as to control the speed and torque of control wheel 30. Power to control shaft 72 may be provided by an electric motor, internal combustion engine, gas turbine engine or other variable speed power source.

Transmission 100 may be housed in any number of housings or casings. Control shaft 72 would pass through the housing and be rotatably supported by bearings on either side of the housing. Internal gear housing 52 may be located adjacent to but not touching control wheel 30. Casing 42 and internal gear housing 52 may be supported rotatably by bearings within a housing. Input shaft 10 and output shaft 60 would likewise be rotatably supported by bearings. The housing enclosure could take any shape such as square or cylindrical depending on the use to which transmission 100 is put. Internal gear housing 52 may be positioned very near control wheel 30.

Transmission 100 functions as a frictionless clutch to apply rotational power gradually from zero to a maximum at constant torque throughout the speed range. Unlike a traditional transmission which converts power from high speed and low torque to low speed and high torque, the orbital transmission is a constant torque output device with two torque inputs and two power inputs. As used herein the following terms are defined.

$r_1$=radius of orbiting shaft second gear 22
$r_2$=effective radius of control wheel 30 from center of shaft 12 to engagement of orbiting shaft second gear 22 and internal gear 56.
$r_c$=difference between $r_2$ and $r_1$ and is the radius of rotation control.
$w_c$=$w_{out}$=angular rotation rate of turn of orbiting shaft 20 about input shaft 10=angular rotation rate of control wheel 30.
$T_H$=holding torque required on control wheel 30.
$T_{in}$=input torque to input shaft 10, input shaft gear 18, orbiting shaft first gear 28 (assuming input shaft gear 18 and orbiting shaft first gear 28 have equal radii), orbiting shaft second gear 22 and orbiting shaft 20.
$w_1$=$w_{in}$=angular rate of input shaft 10, input shaft gear 18, orbiting shaft second gear 28, orbiting shaft second gear 22 and orbiting shaft 20.
$T_{out}$=output torque to internal gear 56 about output shaft 60.
$w_2$=angular rate of internal gear 56 about center of shaft 60.
$v_a$=tangential velocity of center of orbiting shaft second gear 22

When the rotation rate of control arm 70 is zero ($w_c$=0), transmission 100 causes a direct drive at maximum speed and torque to orbiting shaft second gear 22 and internal gear 56.

Let $w_{in}$=$w_1$. Since $w_c$=0, the peripheral velocity of orbiting shaft second gear 22 equals that of control wheel 30 or $w_1 r_1$=$v_1$=$w_2 r_2$=$v_2$=$v_a$. Thus the kinematics are:

$$w_{in}=w_1$$

$$w_2=w_1 r_1/r_2=w_{in}(r_1/r_2)$$

Therefore, $w_{out}$=$w_2$=$w_{in}(r_1/r_2)$. The result is that the output rotation rate is equal to the input rotation rate times the ratio of the radii of orbiting shaft second gear 22 to internal gear 56.

The torques on each gear and the control arm are assumed to balance neglecting inertia effects of acceleration at startup.

$$T_{in}=f_1 r_1 \quad T_{out}=f_1 r_2$$

Also, holding torque, $T_h$=$f_1 r_c$=$(T_{in}/r_1) r_c$=$T_{in}((r_2-r_1)/r_1)$. Therefore, the output torque is equal to the input torque to orbiting shaft second gear 22 times the ratio of the radii of internal gear 56 to the radii of orbiting shaft second gear 22. Thus the torque does not depend on the size of control wheel 30. Also, the holding torque depends on the product of the input torque times the ratio of the difference in $r_2$ (the radius of the control wheel) and $r_1$ (the radius of the orbiting shaft second gear) to $r_1$, the radius of orbiting shaft second gear 22. Thus, if $r_2$=$r_1$, the holding torque is negligible. The power out, $P_{out}$=$T_{out}W_{out}$ is equal to the power in, $P_{in}$=$T_{in}W_{in}$.

When the rotation rate of control arm 70 is not equal to zero, ($w_c \neq 0$), transmission 100 causes a reduced rotation rate or even a reverse rotation rate plus a torque to the output gear. $w_c r_c$=$v_a$, the velocity of the center of the input gear as it orbits.

$$v_b=v_a-w_{in}r_1=w_c r_c-w_{in}r_1$$

also $V_b$=$w_2 r_2$=the tangential velocity of internal gear 56. The output rotation rate is the difference in the products of the input rotation rate $w_{in}$ times the radius of orbiting shaft second gear 22 less the product of control arm 70 rotation rate times its radius divided by the radius of internal gear 56. Since $r_c$=$r_2-r_1$, this can be rewritten as $$w_{out}=(w_{in}r_1-w_c(r_2-r_1))/r_2$$

or $$w_{out}=((w_{in}+w_c)r_1-w_c r_2)/r_2$$

Thus if the control arm rotation rate $W_C$ is zero then $w_{out}$=$w_{in}(r_1/r_2)$, which is the result obtained in the first case discussed above in which the rotation rate of control arm 70 was zero ($w_c$–0)

Neglecting acceleration effects, the steady state torques balance on each gear as in case where $w_c$=0 and thus the output torque is related exactly the same as is the holding torque. Restating:

$$T_{out}=T_{in}(r_2/r_1)$$

$$T_h=T_{in}((r_2-r_1)/r_1)$$

Thus for constant gear radii the output torques and holding torque are the same as before.

Power is the product of torque and rotation rate. In other words, $$P_{in}=T_{in}w_{in}$$

and $$P_{out}=T_{out}w_{out}$$

Thus the output torque times velocity or output power is $$P_{out}=T_{out}w_{out}=T_{in}((w_{in}r_1)-(w_c r_c)/r_1)$$

Since the holding torque also inputs power to the system $$P_h=T_h w_c=T_{in}((r_2-r_1)/r_1)w_c=T_{in}(r_c/r_1)w_c$$

$$P_{out}=P_{in}-P_h$$

So the output power is equal to the input power minus the power to do the holding. Rewritten:

$$P_{out}=T_{in}w_{in}-T_{in}((r_2-r_1)w_c$$

When $W_{in}r_1$=$w_c r_c$=$w_c(r_2-r_1)$ internal gear 56 stops and $P_{out}$ goes to 0. Thus the power output is linearly related to $w_c$, the angular rate of rotation of control arm 70. The critical speed for control arm 70 is thus $w_c$=$w_{in}(r_1/(r_2-r_1))$=$w_{in}(r_1/r_c)$.

FIG. 2 shows the method of connecting shaft 10 to the object to be driven by the power transmitted. Working shaft 80 may be linkage to the drive of a motor vehicle or it may be linkage to the drive of a heavy machine. Because of the unique nature of transmission 100 neutral must be achieved before linking output shaft 60 to working shaft 80. Spline 90 is slidingly engaged to working shaft 80. In order to connect output shaft 60 and working shaft 80, either both output shaft 60 and working shaft 80 must be stopped or both output shaft 60 and working shaft 80 must be rotating at the same speed. Sensors (not shown) are employed to determine the speed of rotation of working shaft 80 and output shaft 60. When transmission 100 is in neutral, spline 90 moves from a first position on working shaft 80 to a second position on both working shaft 80 and output shaft 60 joining working shaft 80 and output shaft 60.

FIG. 3 depicts spline 90 in its second position with shaft 80 and shaft 60 engaged. Transmission 100 can be disconnected by moving spline 90 from the second position of FIG. 3 back to the first position of FIG. 2.

FIG. 4 depicts a cross sectional view of spline 90 along line 4—4 of FIG. 3. Spline 90 is slidingly engaged with output shaft 60.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed:

1. A transmission comprising an input shaft engaged to an orbiting shaft, an orbiting gear affixed to the orbiting shaft and engaged to an internal gear, said internal gear affixed to an output shaft; wherein the orbiting shaft orbits around the input shaft and the direction of rotation of the input shaft is the same as the direction of orbit of the orbiting shaft; a control arm engaged to a control wheel and to a second power source;

wherein the control wheel rotates about the input shaft and is rotatably connected to the orbiting shaft; and wherein the relative speed of orbit of the orbiting gear to the rotation of the input shaft determines the output speed of said transmission.

2. A transmission for transmitting variable speed at constant torque from a first power source comprising:

an input element comprising;

an input shaft connected to the first power source;
an input shaft gear fixedly connected to said input shaft;
a casing rotationally connected to said input shaft;

a control element comprising;

a control arm engaged to a second power source;
a control wheel engaged to the control arm; wherein said control wheel rotates about the axis of the input shaft;

an output element comprising;

an orbiting shaft rotationally connected to said control wheel and to said casing;
an orbiting shaft first gear engaged to said input shaft gear;
an orbiting shaft second gear fixedly connected to said orbiting shaft and engaged to an internal gear;
an output shaft fixedly connected to said internal gear;

wherein, when said second orbiting gear orbits about the center of the input shaft at the same number of revolutions per unit of time as said input shaft rotates, said transmission is in neutral;

wherein, when said orbiting gear orbits about the center of the input shaft at less revolutions per unit of time as said input shaft rotates, said transmission imparts rotation in a first direction;

wherein, when said orbiting gear orbits about the center of the input shaft at more revolutions per unit of time as said input shaft rotates, said transmission imparts rotation in a second direction.

3. The apparatus of claim 2 further comprising a spline slidingly engaged to a working shaft; wherein said spline is moved from a first position to a second position when the working shaft and the output shaft are rotating at approximately the same speed; and wherein when said spline is in the second position, said spline connects said working shaft to said output shaft.

4. The apparatus of claim 2 further comprising a spline slidingly engaged to a working shaft; wherein said spline is moved from a first position to a second position when the working shaft and the output shaft are not rotating; and wherein when said spline is in the second position, said spline connects said working shaft to said output shaft.

5. The apparatus of claim 2 further comprising:

a casing first end; and
a first input shaft bearing rotatably engaged in said casing first end;
the input shaft rotatably supported by said first input shaft bearing;
a first orbiting shaft bearing rotatably engaged in said casing first end;
a second input shaft bearing rotatably engaged in said control wheel; and
a second orbiting shaft bearing rotatably engaged in said control wheel.

6. A method for transmitting variable speed at constant torque from a first power source in a transmission having an input shaft engaged to an orbiting shaft, an orbiting gear affixed to the orbiting shaft and engaged to an internal gear and said internal gear affixed to an output shaft; wherein the orbiting shaft orbits around the input shaft responsive to a control gear and wherein said control gear is engaged to a control shaft engaged to a second power source and wherein the direction of rotation of the input shaft is the same as the direction of an orbit of the orbiting shaft, comprising the steps of:

responsive to a request for zero movement, causing an orbital speed of the orbiting shaft to equal a rotational speed of the input shaft connected to a first power source;

responsive to a request for motion in a first direction, adjusting the relative speeds of the orbit of said orbiting shaft and the rotational speed of said input shaft so that the rotational speed of the input shaft is greater than the orbital speed of the orbiting shaft; and responsive to a request for motion in a second direction, adjusting the relative speed of orbit of said orbiting shaft and the rotational speed of said input shaft so that rotational speed of the input shaft is less than the orbital speed of the orbiting shaft.

7. The method of claim 6 further comprising the step of moving a spline slidingly engaged to a working shaft from a first position to a second position when the working shaft and the output shaft are rotating at approximately the same speed so that when said spline is in the second position, said spline connects said working shaft to said output shaft.

8. The method of claim 6 further comprising the step of moving a spline slidingly engaged to a working shaft from a first position to a second position when the working shaft and the output shaft are not rotating so that when said spline is in the second position, said spline connects said working shaft to said output shaft.

* * * * *